(12) United States Patent
Broersma et al.

(10) Patent No.: US 12,359,650 B2
(45) Date of Patent: Jul. 15, 2025

(54) ROTOR BLADE OF A WIND TURBINE COMPRISING A LIFT MODIFYING DEVICE AND METHOD FOR INSTALLING THEREOF

(71) Applicant: Siemens Gamesa Renewable Energy A/S, Brande (DK)

(72) Inventors: Liekele Broersma, Vejle (DK); Peder Bay Enevoldsen, Vejle (DK); Alejandro Gomez Gonzalez, Aarhus (DK); Alex Loeven, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/921,129

(22) PCT Filed: Apr. 27, 2021

(86) PCT No.: PCT/EP2021/060989
§ 371 (c)(1),
(2) Date: Oct. 25, 2022

(87) PCT Pub. No.: WO2022/063442
PCT Pub. Date: Mar. 31, 2022

(65) Prior Publication Data
US 2023/0250799 A1    Aug. 10, 2023

(30) Foreign Application Priority Data
Sep. 24, 2020    (EP) .................................... 20198174

(51) Int. Cl.
*F03D 1/06*    (2006.01)
*F03D 7/02*    (2006.01)

(52) U.S. Cl.
CPC ............ *F03D 1/0675* (2013.01); *F03D 7/022* (2013.01); *F03D 7/0232* (2013.01);
(Continued)

(58) Field of Classification Search
CPC ...... F03D 1/0675; F03D 7/0232; F03D 7/022; F05B 2240/30; F05B 2240/305;
(Continued)

(56) References Cited

U.S. PATENT DOCUMENTS 5,803,410 A * 9/1998 Hwang ................. B64C 21/025
                                                     114/67 A
5,848,768 A * 12/1998 Seyfang ................ B64C 21/025
                                                     244/198
(Continued)

FOREIGN PATENT DOCUMENTS

CN    1793643 A    6/2006
CN    102996331 A    3/2013
(Continued)

OTHER PUBLICATIONS

International Search Report and Written Opinion for PCT/EP2021/060989 issued on Aug. 10, 2021.

*Primary Examiner* — Topaz L. Elliott
(74) *Attorney, Agent, or Firm* — Schmeiser, Olsen & Watts LLP

(57) ABSTRACT

A rotor blade of a wind turbine is provided, the rotor blade including a lift modifying device having at least one fluid jet module and at least one compressed fluid source, wherein the at least one fluid jet module includes multiple fluid jets, which are fluidically connected to the at least one compressed fluid source, whereby the at least one fluid jet module is mounted as an add-on onto an outer surface of the suction side or the pressure side of the rotor blade. Also provided is a method for installing this rotor blade, whereby a rotor blade is provided and the at least one fluid jet module is mounted as an add-on onto the outer surface of the suction side or the pressure side of the rotor blade.

16 Claims, 5 Drawing Sheets

(52) U.S. Cl.
CPC ....... *F05B 2230/80* (2013.01); *F05B 2240/30* (2013.01); *F05B 2240/305* (2020.08); *F05B 2260/901* (2013.01)

(58) Field of Classification Search
CPC .............. F05B 2230/60; F05B 2230/80; F05B 2260/901; B64C 2230/22; B64C 2230/04; B64C 21/08; B64C 21/04
See application file for complete search history.

(56) References Cited

U.S. PATENT DOCUMENTS

| | | |
|---|---|---|
| 8,616,846 B2 | 12/2013 | Nanukuttan et al. |
| 9,194,369 B2 * | 11/2015 | Dixon ..................... F03D 7/022 |
| 10,556,671 B2 * | 2/2020 | Warsop ................ B64C 21/08 |
| 10,723,443 B2 * | 7/2020 | Ruppert ................ B64C 21/025 |
| 10,737,772 B2 * | 8/2020 | Langenbacher ........ F15D 1/008 |
| 11,085,471 B2 * | 8/2021 | Nino ...................... B64C 21/00 |
| 2003/0091436 A1 | 5/2003 | Stiesdal |
| 2006/0140760 A1 | 6/2006 | Saddoughi et al. |
| 2007/0258823 A1 * | 11/2007 | Haarh ..................... F03D 13/40 29/889.6 |
| 2010/0104436 A1 * | 4/2010 | Herr ........................ F03D 80/00 416/31 |
| 2010/0266382 A1 * | 10/2010 | Campe ................... F03D 1/0608 290/55 |
| 2011/0018268 A1 | 1/2011 | Snel et al. |
| 2011/0103950 A1 | 5/2011 | Pesetsky |
| 2011/0142595 A1 * | 6/2011 | Santiago ............... F03D 1/0675 416/235 |
| 2011/0217167 A1 * | 9/2011 | Hancock ............... F03D 1/0675 416/23 |
| 2012/0128489 A1 | 5/2012 | Jeffus |
| 2012/0141271 A1 | 6/2012 | Southwick |
| 2013/0022464 A1 * | 1/2013 | Dixon ................... F03D 1/0675 416/1 |
| 2013/0284273 A1 * | 10/2013 | Boespflug ............. F03D 1/0675 137/13 |
| 2014/0301864 A1 | 10/2014 | Singh |
| 2016/0177922 A1 | 6/2016 | Zamora Rodriguez et al. |
| 2017/0001715 A1 * | 1/2017 | Warsop ................... B64C 21/02 |
| 2017/0088254 A1 * | 3/2017 | Hong ....................... B64C 21/04 |
| 2017/0267332 A1 * | 9/2017 | Ruppert ................ B64C 21/025 |
| 2017/0370387 A1 * | 12/2017 | Nino ..................... F15D 1/0075 |
| 2018/0162521 A1 * | 6/2018 | Langenbacher ........ F15D 1/004 |
| 2018/0328336 A1 | 11/2018 | Zuteck et al. |
| 2019/0118923 A1 * | 4/2019 | Holmes ................. F15D 1/0055 |
| 2020/0011290 A1 * | 1/2020 | Akay ..................... F03D 7/022 |
| 2020/0116122 A1 * | 4/2020 | Hertel Nilsson Van Kalken ........ B29C 64/10 |
| 2022/0154686 A1 * | 5/2022 | Burchardt ............... F03D 7/022 |
| 2024/0110542 A1 * | 4/2024 | Nielsen ................. F03D 7/0232 |

FOREIGN PATENT DOCUMENTS

| | | | |
|---|---|---|---|
| CN | 104220746 A | | 12/2014 |
| CN | 112253391 A | * | 1/2021 ........... F03D 1/0675 |
| DE | 102016224889 B4 | * | 11/2019 ............ B64C 21/02 |
| EP | 2253838 A1 | | 11/2010 |
| EP | 2053240 B1 | | 3/2011 |
| EP | 2604866 A1 | * | 6/2013 ............ F01D 5/186 |
| EP | 2998571 A1 | | 3/2016 |
| EP | 3115599 A1 | * | 1/2017 .......... F03D 1/0675 |
| EP | 3907401 A1 | | 11/2021 |
| FR | 3097276 A1 | * | 12/2020 .......... F03D 1/0675 |
| WO | 2008080407 A1 | | 7/2008 |
| WO | 2011/026495 A2 | | 3/2011 |

* cited by examiner

ROTOR BLADE OF A WIND TURBINE COMPRISING A LIFT MODIFYING DEVICE AND METHOD FOR INSTALLING THEREOF

CROSS-REFERENCE TO RELATED APPLICATIONS

This application claims priority to PCT Application No. PCT/EP2021/060989, having a filing date of Apr. 27, 2021, which claims priority to EP Application Serial No. 20198174.3, having a filing date of Sep. 24, 2020, the entire contents both of which are hereby incorporated by reference.

FIELD OF TECHNOLOGY

The following relates to a rotor blade of a wind turbine comprising a lift modifying device and a method for manufacturing/installing thereof.

BACKGROUND

Several different types of flow regulating devices such as lift modifying devices can be used in wind turbines. Different desired aerodynamic characteristics may be achieved by the flow regulating devices in order to aim at a given goal, e.g., to increase or decrease the lift of the rotor blades.

In lift modifying devices of an active type, external energy is supplied to activate the lift modification by the device. Such a device is known from EP 2998571 A1, for example, and has the benefit that the aerodynamic characteristics of the rotor blade can be actively controlled. However, the installation and integration of the lift modifying device in the wind turbine is rather complex.

Other lift modifying devices of the active type are known, in which fluid jets in the form of holes are integrated into the shell. However, this requires drilling the holes into the shell of the rotor blade and/or having a pressurized or vacuum vessel outside of the rotor blade. This weakens the structural integrity of the rotor blade. Also, installing such a lift modifying device on existing rotor blades is very cumbersome.

SUMMARY

An aspect relates to a rotor blade having a lift modifying device of the active type and an associated method for manufacturing/installing thereof, where the lift modifying device is easy to install and its installation does not weaken the structural integrity of the rotor blade.

Thereby, the features and details described in connection with the rotor blade of embodiments of the invention apply in connection with the method, so that regarding the disclosure of the individual aspects it is or can be referred to one another.

According to a first aspect of embodiments of the invention, the problem is solved by a rotor blade of a wind turbine, the rotor blade comprising a lift modifying device having at least one fluid jet module and at least one compressed fluid source, wherein the at least one fluid jet module comprises multiple fluid jets, which are fluidically connected to the at least one compressed fluid source, whereby the at least one fluid jet module is mounted as an add-on onto an outer surface of the suction side or the pressure side of the rotor blade.

The at least one fluid jet module may be configured to generate a fluid curtain separating an air flow on the suction side or the pressure side of the rotor blade, when the at least one compressed fluid source supplies compressed fluid to the at least one fluid jet module. For example, the fluid jet module can be placed along the whole spanwise extension of the blade, or only on the outer 50% of the blade. And regarding a chordwise position, it can be placed somewhere between 1% and 60% of the chord, or between 5% and 45% of the chord.

The lift modifying device according to the first aspect of embodiments of the invention is of an active type. When the lift modifying device is activated, i.e., compressed fluid is supplied from the at least one compressed fluid source to the multiple fluid jets, the multiple fluid jets stream out the compressed fluid on the outer surface of the rotor blade, thereby generating a fluid curtain separating the air flow on the suction side or pressure side of the rotor blade. Consequently, the lift coefficient is decreased, and the drag coefficient is increased. The fluid flow around the airfoil becomes stalled and the aerodynamic loads due to lift are reduced, while the aerodynamic loads due to drag are increased.

The lift modifying device may be activated in operational or environmental conditions of the wind turbine benefiting from these lower lift loads and higher drag loads such as shutdown procedures, extreme gusts or turbulence, and pitch actuation, for example. However, when the lift modifying device is not activated, i.e., is deactivated, no compressed fluid is supplied to the multiple fluid jets, and the lift coefficient and the drag coefficient are not influenced by the lift modifying device or very minimally influenced in case of adding a device to a blade. Thereby, a high lift coefficient and low drag coefficient, e.g., due to the design of the rotor blade, may be maintained in normal operation of the wind turbine, i.e., without presence of the operational or environmental conditions mentioned above, such that it may be operated in an efficient manner.

According to the first aspect of embodiments of the invention, the at least one fluid jet module is mounted as an add-on on an outer surface of the suction side or the pressure side of the rotor blade. The fluid jet module being designed as an add-on means that it is a separate part, which may be mounted on new or existing wind turbines. Accordingly, the at least one fluid jet module may be mounted onto a new rotor blade or onto a used rotor blade as add-on for retrofitting. The fluid jet module accordingly is a unit separate from the shell of the rotor blade or, in other words, not part of the shell of the rotor blade upon manufacture. Instead, the at least one fluid jet module is joined with the shell by mounting it to the shell of the rotor blade. The fluid jet module may be mounted onto the outer surface of the suction side or pressure side of the rotor blade with its length extending in the spanwise direction of the rotor blade.

The rotor blade can be provided with the at least one fluid jet module on the suction side or the pressure side of its airfoil. The at least one compressed fluid source must be operating, i.e., supply compressed fluid to the at least one fluid jet module, for the lift of the rotor blade to be modified.

In contrary to most of the lift modifying devices in the state of the art, which are focusing on the enhancement of the aerodynamics of the airfoil, the proposed solution provides for separating or, in other words, destroying the air flow around the airfoil of the rotor blade, thereby reducing the lift coefficient and increasing the drag coefficient at the same time. The separation of the air flow around the airfoil or outer surface of the rotor blade, which may also be referred to as a main flow, is achieved by the actively generated fluid curtain on the outer surface of the rotor blade. For this purpose, the at least one fluid jet module of the lift modifying device is mounted onto the outer surface of the suction side or the pressure side of the airfoil of the rotor blade. The further components of the lift modifying device may in particular be arranged inside of the rotor blade and/or the wind turbine.

For some particular situations, such as certain types of emergency shutdowns, it may be beneficial to place the at least one fluid jet module on the pressure side of the airfoil instead of the suction side of the airfoil.

The fluid jets are in particular configured for communication with the surroundings of the airfoil. The fluid jets are in particular directed into a direction out of the airfoil of the rotor blade. The compressed fluid is exerted into the surroundings of the airfoil on the suction side or pressure side of the airfoil as the fluid curtain. The fluid curtain may be described as a stream of compressed fluid streaming out from the multiple fluid jets. It may be provided that various, most or all of the multiple fluid jets are aligned linearly or substantially linearly. Thereby, the fluid curtain may be generated along a straight or substantially straight line to separate the fluid flow on the suction side or pressure side of the rotor blade by a straight or substantially straight fluid curtain.

The at least one compressed fluid source provides compressed fluid, which may be under a pressure that is greater than atmospheric pressure. The compressed fluid source may be configured to supply compressed fluid with at least 200 kPa, in particular at least 1000 kPa. Accordingly, the compressed fluid may be supplied at that pressure. However, the pressure at the fluid jets may be lower since pressure may be lost on the way there. The supplied compressed fluid may in particular be air, dry air, or any other inert gas.

It may be provided that the at least one fluid jet module is designed as a panel. A panel is a relatively flat, i.e., has little thickness, and elongate body with two large surfaces opposite of one another. Accordingly, one of these two large surfaces may be configured in its shape for easy mounting on the outer surface of the rotor blade. This large surface may correspond in shape to the portion of the outer surface onto which the at least one fluid jet module is mounted such that a good form-fit may be achieved. The opposite large surface is the surface of the at least one fluid jet module located on the airfoil of the rotor blade. It can have a curvature corresponding to the overall shape of the rotor blade at the portion of the outer surface of the rotor blade onto which it is mounted.

It may also be provided that the at least one fluid jet module comprises a curved outer shape on its outer side. The curved outer shape may correspond to the airfoil shape of the rotor blade. Thereby, an aerodynamic design may be achieved, when the at least one fluid jet module is arranged at the suction side or pressure side of the rotor blade.

It may further be provided that the at least one fluid jet module has a curved profile. The curved profile, which may be a panel with two opposite large surfaces as explained above, allows for form-fitting of the fluid jet module with the outer surface of the rotor blade and good aerodynamic properties of the rotor blade at the location of the at least one fluid jet module.

It may also be provided that the at least one fluid jet module is mounted by at least one adhesive, at least one tape and/or mechanical fasteners onto the outer surface of the rotor blade. The mechanical fasteners may be screws, bolts or similar. The different mountings the at least one fluid jet module to the outer surface of the rotor blade provide for different advantages. The adhesive allows for a very uniform attachment of the at least one fluid jet module to the outer surface of the rotor blade. The tape is easy to handle and allows for a very simple mounting. The mechanical fasteners allow for reversible mounting, i.e., reversible without destruction of the shell of the rotor blade and the at least one fluid jet module.

Accordingly, it may be provided that the at least one fluid jet module is mounted reversibly onto the outer surface of the rotor blade. Thereby, the at least one fluid jet module may not only be removed from the rotor blade very easily but also relocated if it is found that the at least one fluid jet module is more effective in a different portion of the outer surface of the rotor blade, or a different lift modification shall be achieved by the at least one fluid jet module.

Also, it may be provided that the at least one fluid jet module is embedded in a recess of the shell of the rotor blade. This means that the at least one fluid jet module is not simply attached to an outside of the rotor blade as an add-on but integrated at least partially, in particular entirely into the rotor blade, in particular its shell. The shell of the rotor blade for this purpose comprises the recess corresponding in shape to the at least one fluid jet module. The at least one fluid jet module may be provided flush with the airfoil or shell of the rotor blade. Thereby, the aerodynamic properties, in particular the lift and drag coefficients, of the rotor blade are maintained when the lift modifying device is not activated.

In addition, it may be provided that the at least one fluid jet module comprises a fluid flow channel fluidically communicating with the multiple fluid jets. The fluid flow channel may be fluidically connected to the at least one compressed fluid source via at least one fluid supply line. Thereby, the fluid flow channel transports the compressed fluid from the at least one compressed fluid source to the multiple fluid jets.

It may further be provided that the multiple fluid jets in the at least one fluid jet module are provided as orifices fluidically connected to the at least one compressed fluid source. The orifices are easy to manufacture and thereby reduce the manufacturing/installing cost of the lift modifying device. Alternatively, or additionally, the fluid jets or orifices may be placed at different locations with respect to the rotor blade. Thereby, the position of the fluid curtain on the suction side may be adjusted and the location of separation of the fluid flow around the airfoil may be shifted. By providing the orifices in the fluid jet module as the add-on for the rotor blade instead of in the rotor blade, in particular the shell, itself, the structural integrity of the rotor blade is maintained.

Moreover, it may be provided that vortex generators, ramps, spoilers and/or flaps are attached to the at least one fluid jet module. Thereby, the lift modification achieved by the at least one fluid jet module designed as the add-on may be further varied. By the vortex generators, for example, the lift coefficient of the rotor blade in normal operation of the rotor blade may be increased under certain situations. However, when operational or environmental conditions require, the lift coefficient may be efficiently reduced by the lift modifying device. Because opposing effects are achieved by the vortex generators and the lift modifying device, this measure may seem odd. However, due to the lift modifying device being of an active type, the vortex generators may be used to increase the efficiency of the wind turbine and at the same time the reduced loads may still be achieved in the required situations by activating the lift modifying device. Furthermore, by careful placement of the jet orifices in combination with the vortex generators or other devices, the injection of air can be performed at a very local level close to the position of the individual elements (e.g., the fins of the vortex generators). In this manner, the vortex creation process at the vortex generator is inhibited. The vortex generators, ramps, spoilers and/or flaps may be separate parts reversibly attached to the at least one fluid jet module. Thereby, these components can be easily replaced when damaged and further components may be easily added to the fluid jet module.

Also, it may be provided that at least one fluid supply line fluidically connecting the at least one fluid jet module with the at least one compressed fluid source is at least partially arranged in an inside of the rotor blade, and attached to a spar web of the rotor blade. Further, any further components of the lift modifying device, such as the compressed fluid source or valves, may be arranged within the rotor blade.

Further, it may be provided that the at least one fluid supply line is attached externally to the outer surface of the rotor blade and is routed to a feed hole inside of the shell of the rotor blade, by which the at least one fluid supply line is fed into the inside of the rotor blade. The at least one fluid supply line may be routed externally, i.e., on an outside of the rotor blade, in the chordwise direction from the fluid jet module to the trailing edge first. The feed hole may be located in the chordwise direction between the at least one fluid jet module and the trailing edge or directly at the trailing edge, for example. Alternatively, the at least one fluid supply line may be entirely routed externally of the rotor blade. In this case, the at least one fluid supply line may first be routed in the chordwise direction from the fluid jet module to the trailing edge and afterwards along the trailing edge to the root of the rotor blade.

Also, it may be provided that the rotor blade comprises at least one structural reinforcement at the location of the feed hole. Thereby, the structurally weakened location around the feed hole is structurally strengthened to avoid failure at that location. The at least one structural reinforcement may, for example, comprise one or more additional layers of laminate around the feed hole compared to the adjacent outer surface of the feed hole.

It may be provided that the at least one compressed fluid source is a compressed fluid source. The compressed fluid source allows for efficient generation of compressed fluid and high compression, thereby generating a fluid curtain of high momentum. In particular, the compressed fluid source may be at least one of a compressor, a blower, a turbocharger, or a piston with a fluid or air bag. The fluid may be a gas. Further, the fluid may in particular be air, nitrogen or any other inert gas. The fluid may be dry air or atmospheric air.

Further, it may be provided that the at least one fluid jet module is at least two fluid jet modules, wherein each of the at least two fluid jet modules comprise multiple fluid jets. Again, both fluid jet modules are mounted as add-ons onto the outer surface of the rotor blade. Thereby, greater flexibility of the lift modifying device with regard to its installation in the rotor blade is provided. For example, the multiple fluid jet modules may be mounted onto the outer surface of the rotor blade at a distance from one another, whereby a larger span along the rotor blade is provided without the necessity of providing fluid jets along the entire length of that span. Thereby, the effect of modifying the lift may nonetheless be achieved but at lower manufacturing/installing costs and with less need of pressurized fluid flow rates.

Therein, it may be provided that each of the at least two fluid jet modules are connected to the at least one compressed fluid source by a valve and/or each of the at least two fluid jet modules is connected to a separate one of the at least one compressed fluid source. By the valve, the supply of compressed fluid from the at least one compressed fluid source may be controlled such that individual ones of the at least two fluid jet modules may be activated, i.e., supplied with compressed fluid to generate the fluid curtain, and others may be deactivated, i.e., not supplied with compressed fluid, whereby they do not generate the fluid curtain. When there are separate compressed fluid sources, i.e., at least two, to which the fluid jet modules are connected, the separate compressed fluid sources may be controlled by their operation, i.e., on or off, to activate or deactivate the fluid jet modules fluidically connected thereto. Thereby, the size and location of the fluid curtain along the span of the rotor blade may be adjusted allowing modification of the lift as currently required in certain operational or environmental situations.

Further, therein it may be provided, that each of the at least two fluid jet modules are connected by a separate fluid supply line to the at least one compressed fluid source. This further enables separate activation of the fluid jet modules by the at least one compressed fluid source.

Moreover, it may be provided that the lift modifying device comprises a control unit connected to the at least one compressed fluid source and/or at least one valve arranged in between the at least one fluid jet module and the at least one compressed fluid source, wherein the control unit is configured for varying the momentum of compressed fluid exiting the multiple fluid jets by controlling the at least one compressed fluid source and/or the at least one valve. In particular, the control unit may be configured to adjust the momentum of the compressed fluid exiting the fluid jets as currently required in certain operational or environmental situations, e.g., by turning on and off the at least one compressed fluid source or varying the pressure of the compressed fluid from the compressed fluid source.

Therein, it may be provided that the control unit is configured to operate the at least one compressed fluid source and/or alternatingly close and open the at least one valve such that the compressed fluid exits the multiple fluid jets as compressed fluid pulses. The operation of the compressed fluid source may be such that it is alternatingly turned on and off, or the compression of fluid or the output of the compressed fluid source is alternatingly increased and decreased. The compressed fluid pulses are pulses of compressed fluid exiting the multiple fluid jets. In other words, the pulses are a sequence of a distinct amount of compressed fluid exiting the multiple fluid jets following no or less compressed fluid exiting the multiple fluid jets and repetition of this sequence. Such method of operation may in particular be favorable to mitigate asymmetric loads of the rotor of the wind turbine, for example during operation in yawed inflow conditions, when balancing tilt loads of the main bearing of the wind turbine and in fault scenarios, e.g., where one blade is stuck due to a faulty pitch system.

According to a second aspect of embodiments of the invention, the problem is solved by a method for installing a rotor blade according to the first aspect of embodiments of the invention, whereby a rotor blade is provided and the at least one fluid jet module is mounted as an add-on onto the outer surface of the suction side or the pressure side of the rotor blade.

The at least one fluid jet module may be mounted reversibly or irreversibly to the outer surface of the suction side or the pressure side of the rotor blade. It may be mounted onto the outer surface of the rotor blade by at least one adhesive, at least one tape and/or mechanical fasteners. The rotor blade itself may be newly manufactured or already existing, i.e., used. Accordingly, a used rotor blade may be retrofitted with the at least one fluid jet module and coupled to other components, in particular a compressed fluid source, of an existing lift modifying device or it may be retrofitted with the entire lift modifying device including the at least one fluid jet module.

It may be provided that the shell of the provided rotor blade has a recess, into which the at least one fluid jet module is fitted. New rotor blades may be thereby equipped with the at least one fluid jet module such that the at least one fluid jet module seamlessly integrates into the rotor blade without having any or only negligible impact on the aerodynamic properties of the rotor blade.

BRIEF DESCRIPTION

Some of the embodiments will be described in detail, with reference to the following figures, wherein like designations denote like members, wherein.

DETAILED DESCRIPTION

Figure 1:
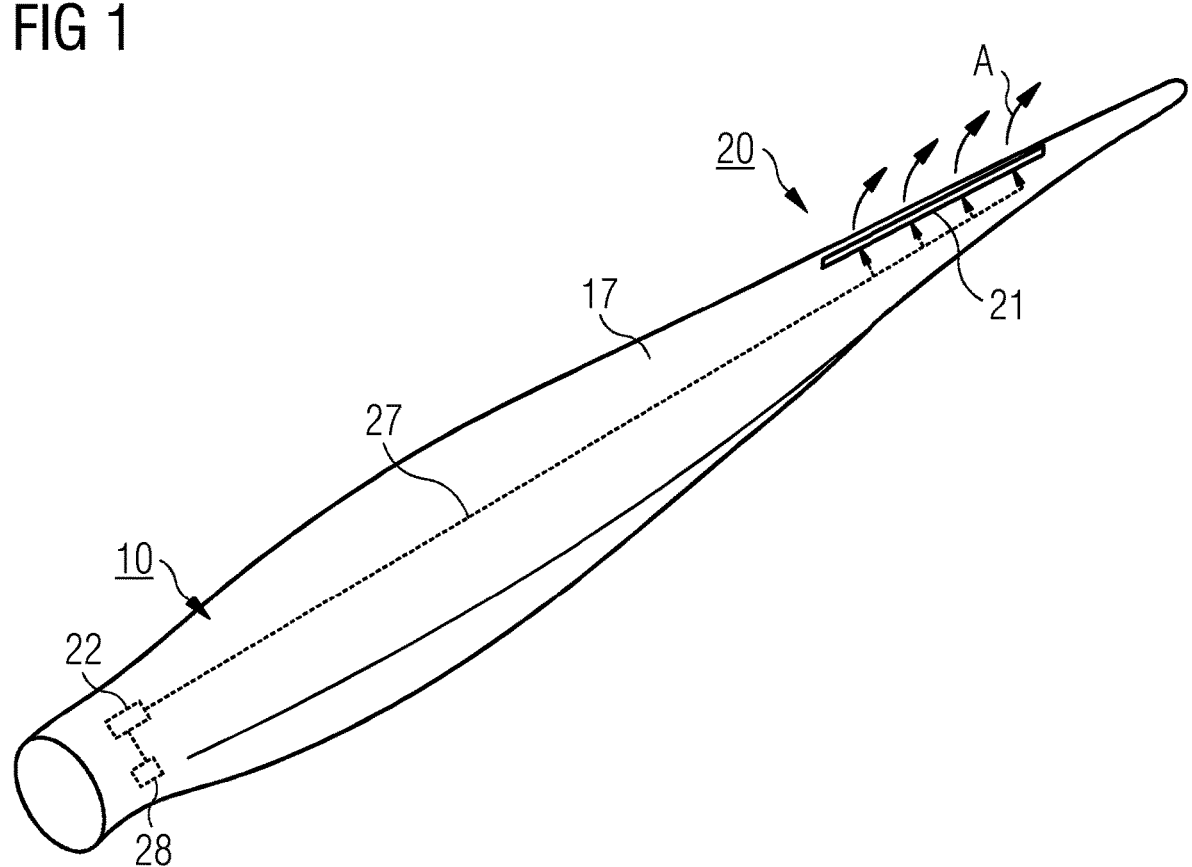
FIG. 1 shows a side perspective view on a rotor blade according to a first embodiment.

FIG. 1 shows a side perspective view on a rotor blade 10 according to a first embodiment. The rotor blade 10 comprises a lift modifying device 20.

The lift modifying device 20 comprises a fluid jet module 21. The fluid jet module 21 is mounted as an add-on in the form of a panel onto an outer surface of a suction side 17 of the rotor blade 10. The mounting may be performed by an adhesive, tapes and/or mechanical fasteners. However, none of these are shown here or in the following figures but rather only the state in which the fluid jet module 21 is mounted onto the outer surface of the shell 11 of the rotor blade 10.

The lift modifying device 20 as shown in FIG. 1 is activated and thus generates a fluid curtain A. The fluid jet module 21 is mounted onto the suction side 17 of the rotor blade 10 closer to the leading edge 15 of the rotor blade 10 than to the trailing edge 16 of the rotor blade 10. Further, the fluid jet module 21 is provided closer to the tip of the rotor blade 10 than to its root. However, the fluid jet module 21 may alternatively be placed closer to the trailing edge 16 or the root, if required. Also, alternatively, the fluid jet module 21 may be arranged on a pressure side 18 (see FIG. 15) of the rotor blade 10. The pressure side 18 is located opposite of the suction side 17 at the rotor blade 10. Such further exemplary alternatives of the positioning of the fluid jet module 21 are shown in FIGS. 11 to 15 and will be discussed later with reference thereto.

The fluid jet module 21 is exposed to the outside of the rotor blade 10 while the further components of the lift modifying device 20, namely a fluid supply line 27, a compressed fluid source 22 and a control unit 28, are located inside of the rotor blade 10 in this particular embodiment. However, the control unit 28 may alternatively be located in the hub of the wind turbine, for example. Thus, the fluid supply line 27, compressed fluid source 22 and control unit 28 are drawn with dashed lines. The location of the compressed fluid source 22 and the control unit 28 are only exemplary, these components may also be located inside the wind turbine having the rotor blade 10. Also, the compressed fluid source 22 may be located directly at or close to the fluid jet module 21. The compressed fluid source 22 is configured to provide compressed fluid to the fluid jet module 21 via the fluid supply line 27. Here, the compressed fluid source 22 is a compressor and the fluid is air. However, other fluids may be used and other types of compressed fluid sources 22 may be used.

Figure 2:
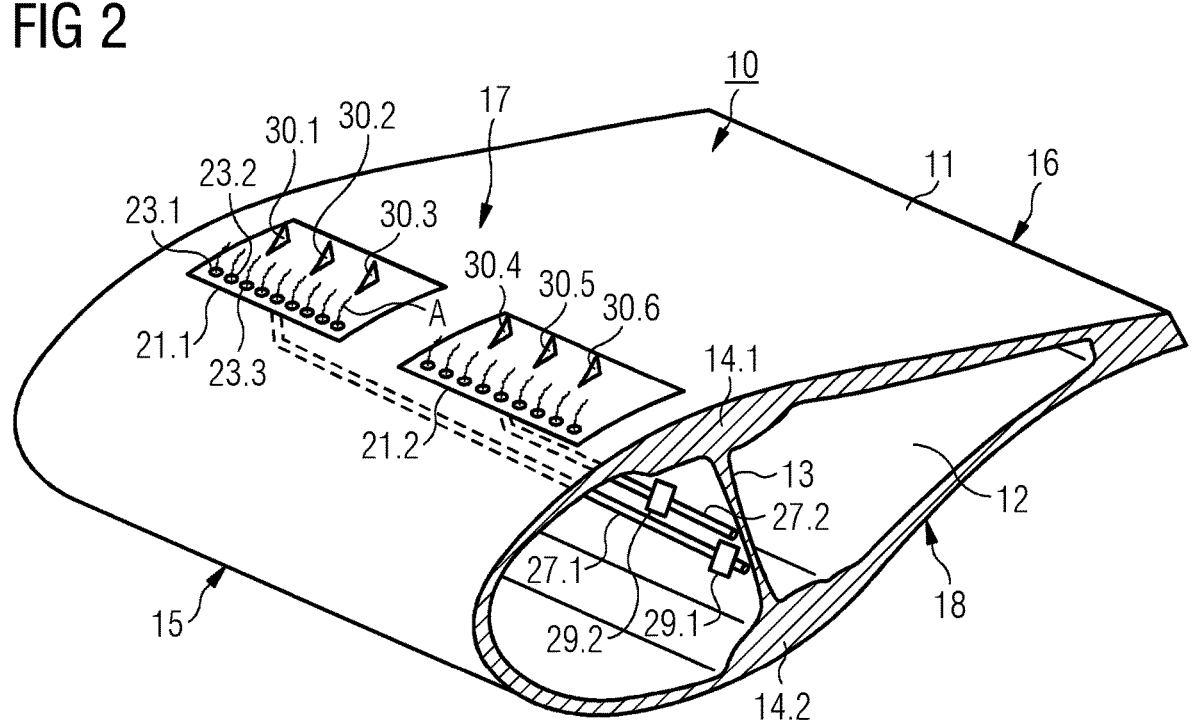
FIG. 2 shows a side perspective view on a section of a rotor blade according to a second embodiment.

FIG. 2 shows a side perspective view on a section of a rotor blade 10 according to a second embodiment. In this second embodiment, the lift modifying device 20 comprises two separate fluid jet modules 21.1, 21.2. However, the number of fluid jet modules 21 may be less or more. The fluid jet modules 21.1, 21.2 are mounted as add-ons onto the outer surface of the suction side 17 of the rotor blade 10 and closer to the leading edge 15 than the trailing edge 16. However, the fluid jet modules 21.1, 21.2 may alternatively be arranged closer to the trailing edge 16 than the leading edge 15.

Each of the fluid jet modules 21.1, 21.2 comprises multiple fluid jets 23. The fluid jets 23.1, 23.2, 23.3 of the fluid jet module 21.1 are exemplary denominated. In this case, the fluid jets 23 are provided as orifices within the fluid jet modules 21.1, 21.2. The fluid jets 23 are linearly aligned to generate a substantially straight fluid curtain A as shown in FIG. 1.

Moreover, the fluid jet modules 21.1, 21.2 are arranged at a distance from one another. However, they may alternatively be arranged next to one another.

Each of the fluid jet modules 21.1, 21.2 is fluidically connected via separate fluid supply lines 27.1, 27.2 to the compressed fluid source 22 (not shown in FIG. 2). Alternatively, each of the fluid jet modules 21.1, 21.2 may be connected to a separate one of multiple compressed fluid sources 22 (not depicted in FIG. 2).

Each of the fluid supply lines 27.1, 27.2 has a valve 29.1, 29.2 installed therein. The valves 29.1, 29.2 are connected to the control unit 28 (not shown in FIG. 2). By controlling the valves 29.1, 29.2, the control unit 28 may close or open the separate fluid supply lines 27.1, 27.2 and selectively activate the fluid jet modules 21.1, 21.2. Alternatively, the two valves 29.1, 29.2 may be a three-way-valve 29 and the fluid supply lines 27.1, 27.2 may merge at the three-way-valve 29. Also, when there are more than two fluid jet modules 21.1, 21.2 there may be more fluid supply lines 27 and more valves 29. The hydraulic or pneumatic circuitry of the fluid jet modules 21 with the compressed fluid source 22 depends on the particular installation and there are many possible circuitries for providing selective activation of separate fluid jet modules 21.1, 21.2 by the control unit 28. FIG. 2 merely illustrates an exemplary embodiment for explaining the principles thereof.

The fluid supply lines 27.1, 27.2 are arranged in the inside 12 of the rotor blade 10. They are attached to a spar web 13 of a spar of the rotor blade 10. The spar in this embodiment is of an I-beam type having two spar caps 14.1, 14.2. However, the spar may be also of any other type, such as a box type spar. Also, alternatively, the fluid supply lines 27.1, 27.2 may be attached to an interior side of the shell 11 of the rotor blade 10.

The rotor blade 10 is further provided with multiple vortex generators 30.1, 30.2, 30.3, 30.4, 30.5, 30.6, six of which are exemplary shown and denominated. The vortex generators 30 are attached to the fluid jet modules 21.1, 21.2 of the rotor blade 10 and increase the lift coefficient. The vortex generators 30 may be integrally designed with the fluid jet modules 21.1, 21.2 or attached thereto by mechanical fasteners, tapes and/or adhesive, such that they may easily be serviced and/or replaced.

Figure 3:
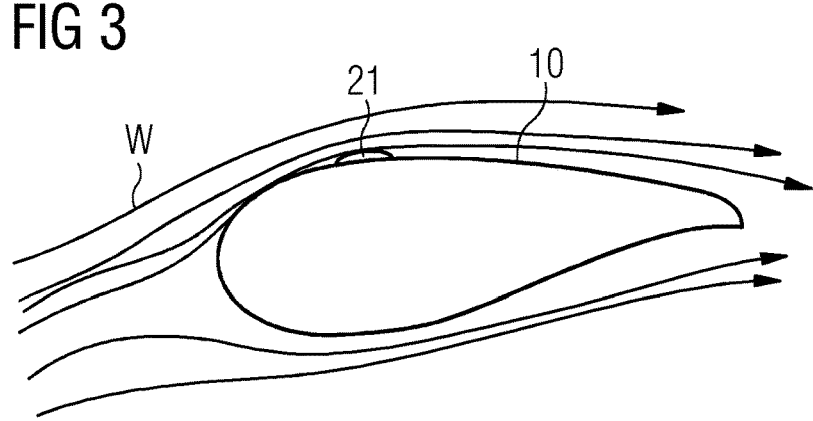
FIG. 3 shows a side view on the rotor blade of FIG. 1 in operation and with the lift modifying device being deactivated.

FIG. 3 shows a side view on the rotor blade 10 of FIG. 1 in operation and with the lift modifying device 20 being deactivated. Here, the air flow W around the airfoil of the rotor blade 10 is not separated by the fluid jet module 21 of the lift modifying device 20. Thereby, the air flow W is an attached air flow W around the airfoil.

Figure 4:
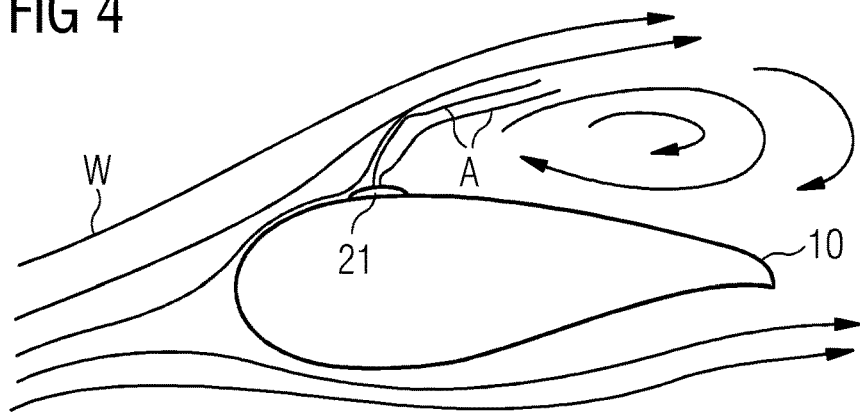
FIG. 4 shows a side view on the rotor blade of FIG. 1 in operation and with the lift modifying device being activated.

FIG. 4 shows a side view on the rotor blade of FIG. 1 in operation and with the lift modifying device 20 being activated. The fluid jet module 21 generates a fluid curtain A or air curtain A and thereby separates the air flow W at the fluid curtain A. The air flow W becomes a separated fluid flow after the fluid jet module 21 and creates a stalled flow. The lift coefficient of the rotor blade 10 is reduced and the drag coefficient of the rotor blade 10 is at the same time increased.

Figure 5:
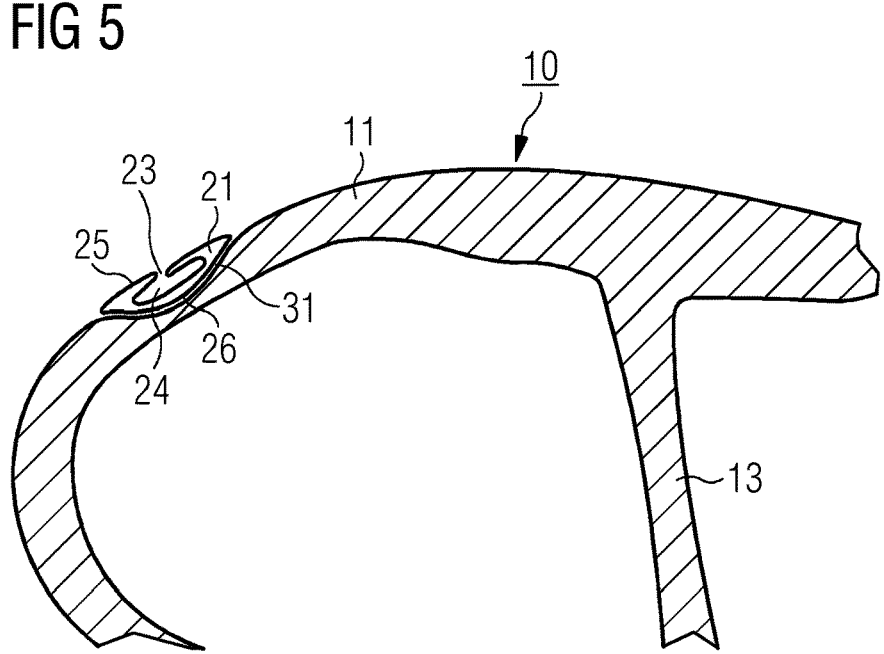
FIG. 5 shows a sectional cut through a portion of a rotor blade according to a third embodiment.

FIG. 5 shows a sectional cut through a portion of a rotor blade 10 according to a third embodiment. Contrary to the rotor blade 10 of FIG. 2, the fluid jet module 21 is embedded in a recess 31 of the shell 11 of the rotor blade 10.

The fluid jet module 21 has a curved outer shape on its outer side 25 to correspond to the shape of the shell 11 of the rotor blade 10. The inner side 26 corresponds in form to a recessed shape of a recess 31 inside of the shell 11 of the rotor blade 10 for form-fitting therewith. The fluid jet module 21 has an elongate body comprising a fluid flow channel 24 fluidically connected to the compressed fluid source 22 and the fluid jets 23.

Figure 6:
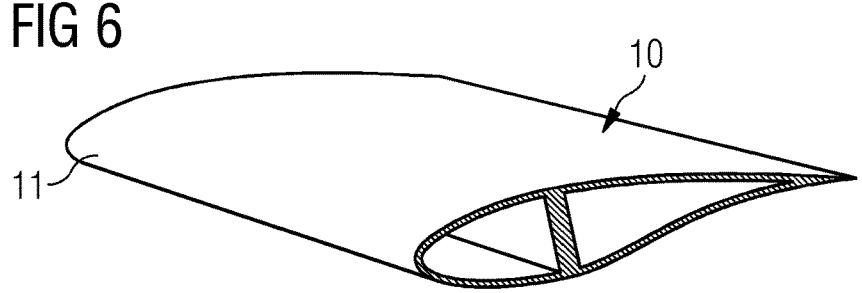
FIG. 6 shows a side perspective view on a section of a further rotor blade.

FIG. 6 shows a side perspective view on a portion of a rotor blade 10 with its shell 11.

Figure 7:
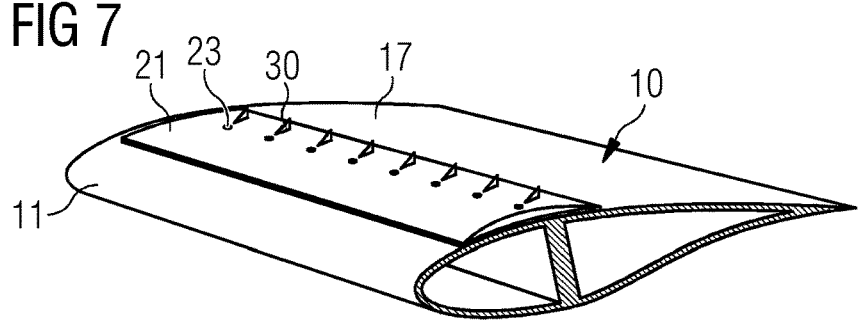
FIG. 7 shows a side perspective view on the rotor blade of FIG. 6 equipped with a fluid jet module according to a first embodiment.

FIG. 7 shows a portion of a fluid jet module 21 in the form of a panel mounted as an add-on onto the outer surface of the suction side 17 of the shell 11 of the rotor blade 10 of FIG. 6. The fluid jet module 21 in this particular embodiment has multiple fluid jet modules 21 (only one is denominated in this and the following FIGS. 8 to 10) provided as orifices in the fluid jet module 21 and further multiple vortex generators 30 (only one denominated). The fluid jet module 21 formed as the panel has a substantially flat shape with two large opposite surfaces.

Figure 8:
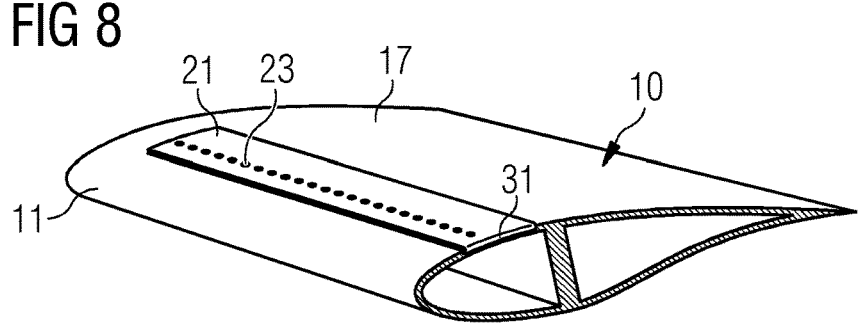
FIG. 8 shows a side perspective view on the rotor blade of FIG. 6 equipped with a fluid jet module according to a second embodiment.

FIG. 8 shows an alternative fluid jet module 21 mounted onto the outer surface of the suction side 17 of the shell 11 of the rotor blade 10 of FIG. 6. This fluid jet module 21 only comprises the multiple fluid jets 23. Further, the fluid jet module 21 is embedded into a recess 31 inside of the shell 11 of the rotor blade 10 and mounted thereto.

Figure 9:
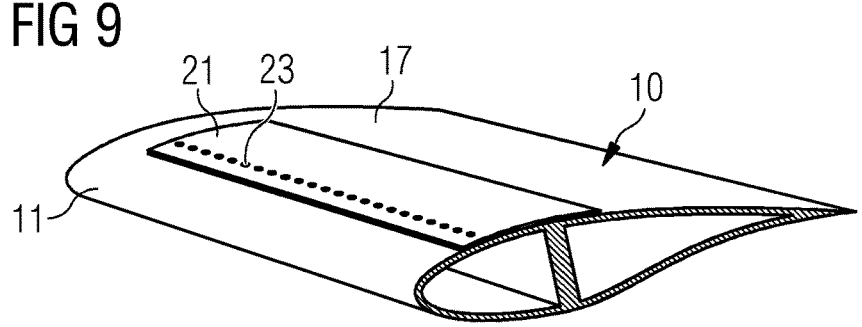
FIG. 9 shows a side perspective view on the rotor blade of FIG. 6 equipped with a fluid jet module according to a third embodiment.

FIG. 9 shows the rotor blade 10 of FIG. 7 with the difference that the fluid jet module 21 only comprises the multiple fluid jets 23. Such fluid jet module 21 may be mounted as an add-on on a used rotor blade 10 without having to make any structural changes to the rotor blade 10.

Figure 10:
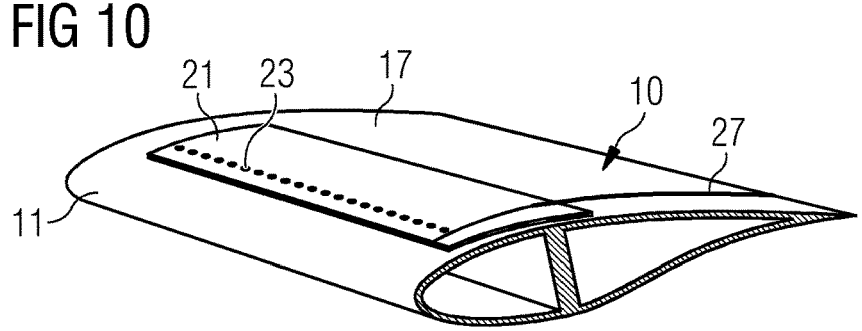
FIG. 10 shows a side perspective view on the rotor blade of FIG. 6 equipped with a fluid jet module according to a fourth embodiment.

FIG. 10 shows an enlarged portion of the rotor blade 10 of FIG. 9, which shows the fluid jet module 21 in its entire length and with the fluid supply line 27 attached externally to the shell 11 of the wind turbine 10 and running in the chordwise direction of the rotor blade 10 to the trailing edge 16 of the rotor blade 10.

Figure 11:
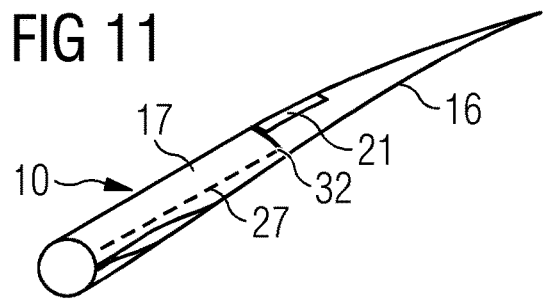
FIG. 11 shows a side perspective view on yet another rotor blade equipped with a fluid jet module at a first position according to a first embodiment.

FIG. 11 shows a rotor blade 10 in its full span. A rectangular shaped fluid jet module 21 is mounted as an add-on onto the suction side 17 of the rotor blade 10 and is located roughly at half span on the suction side 17. The fluid supply line 27 is routed in chordwise direction from the fluid jet module 21 to a location between the fluid jet module 21 and the trailing edge 16 of the rotor blade 10. In this location, the fluid supply line 27 is fed through the outer surface or shell 11 of the rotor blade 10 to the inside 12 of the rotor blade 10. For feeding the fluid supply line 27 into the inside 12, a feed hole 32 is provided in the outer surface or shell 11 of the rotor blade 10. Once inside the rotor blade 10, the fluid supply line 27 is routed along the spar web 13 of the rotor blade 10, as shown in FIG. 2, or along the upper or lower or trailing edge surface of the inside 12 of the rotor blade 10. Alternatively, it may be guided along precasted channels inside the structure of the rotor blade 10.

Figure 12:
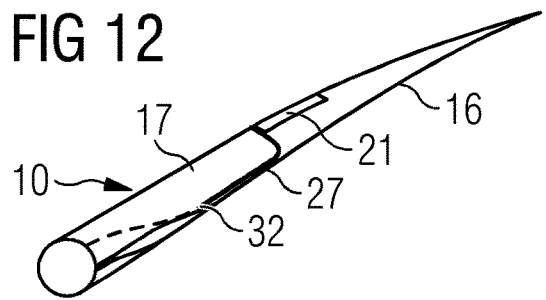
FIG. 12 shows a side perspective view on the rotor blade equipped with a fluid jet module at the first position of FIG. 11 according to a second embodiment.

FIG. 12 shows an alternative routing of the fluid supply line 27 in a rotor blade 10 with a fluid jet module 21 being mounted at the same position as the fluid jet module 21 of FIG. 11. The fluid supply line 27 is routed in the chordwise direction from the fluid jet module 21 to the trailing edge 16 and therefrom along the trailing edge 16 in the direction of the root of the rotor blade 10 to a defined location on the trailing edge 16, where the fluid supply line 27 is again fed through a feed hole 32 and thereby through the outer surface of the rotor blade 10 to the inside 12 of the rotor blade 10.

Figure 13:
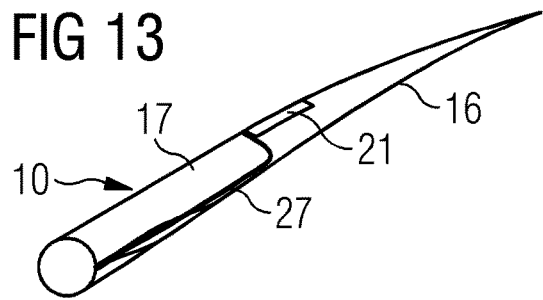
FIG. 13 shows a side perspective view on the rotor blade equipped with a fluid jet module at the first position of FIG. 11 according to a third embodiment.

FIG. 13 shows yet another alternative routing of the fluid supply line 27 in a rotor blade 10 with a fluid jet module 21 being mounted at the same position as the fluid jet module 21 of FIG. 11. The fluid supply line 27 is again routed in chordwise direction from the fluid jet module 21 to the trailing edge 16. Thereafter, the fluid supply line 27 is routed along the trailing edge 16 and externally of the rotor blade 10 towards the root of the rotor blade 10.

Figure 14:
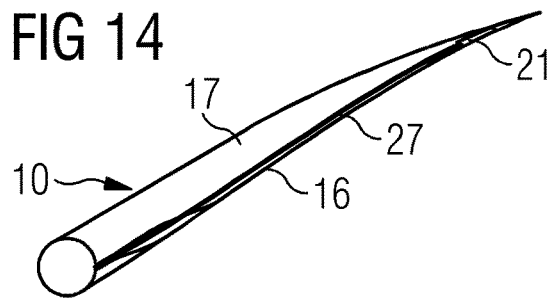
FIG. 14 shows a side perspective view on a rotor blade equipped with a fluid jet module at a second position.

FIG. 14 also shows a rotor blade 10 in its full span. A fluid jet module 21 is mounted as an add-on onto the suction side 17 of the rotor blade 10 and is located outboard on the suction side 17 of the rotor blade 10. The fluid supply line 27 is routed in chordwise direction from the fluid jet module 21 to the trailing edge 16. Thereafter, the fluid supply line 27 is routed along the trailing edge 16 towards the root of the rotor blade 10 along the trailing edge 16. Alternatively, the fluid supply line 27 can be fed through a feed hole 32 in the shell 11 of the rotor blade 10 to the inside 12 of the rotor blade 10 as shown in FIGS. 11 and 12.

Figure 15:
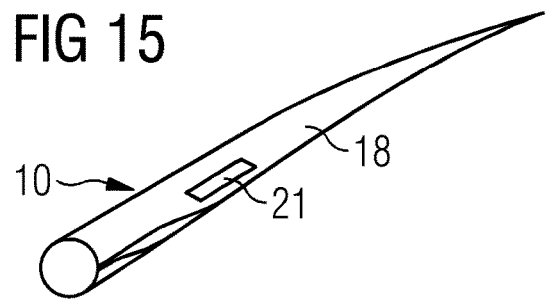
FIG. 15 shows a side perspective view on a rotor blade equipped with a fluid jet module at a third position.

In FIG. 15, a fluid jet module 21 is mounted as an add-on onto the pressure side 18 of a rotor blade 10. The fluid supply line 27 is not depicted in this figure but may be arranged as previously explained, in particular with reference to FIGS. 11 to 14.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor blade of a wind turbine, the rotor blade comprising:
   a lift modifying device having at least one fluid jet module and at least one compressed fluid source, wherein the at least one fluid jet module is a panel and comprises multiple fluid jets, which are fluidically connected to the at least one compressed fluid source,
   wherein the panel of the at least one fluid jet module is mounted as an add-on onto an outer surface of a suction side or a pressure side of the rotor blade, the panel of the at least one fluid jet module having a first surface and a second surface opposite of the first surface, the first surface located on the outer surface of the rotor blade, further wherein the first surface and the second surface each having a shape that corresponds to a shape of a portion of the outer surface of the rotor blade to which the at least one fluid jet module is mounted;
   wherein vortex generators are attached to the second surface of the panel of the at least one fluid module, and, in a chordwise direction, the multiple jets formed by orifices in the panel are located between a leading edge of the rotor blade and the vortex generators;
   wherein, during a normal operation of the rotor blade, the vortex generators increase a lift coefficient of the rotor blade, and in response to operational or environmental conditions, the lift modifying device is configured to be activated such that the at least one compressed fluid source provides an injection of fluid through the multiple jets which generates a fluid curtain that separates air flow around an airfoil of the rotor blade creating a stalled flow after the multiple jets, which reduces the lift coefficient of the rotor blade and inhibits a vortex generation process of the vortex generators placed after the multiple jets.

2. The rotor blade according to claim 1, wherein the fluid curtain separates the air flow on the suction side or the pressure side of the rotor blade, when the at least one compressed fluid source supplies compressed fluid to the at least one fluid jet module.

3. The rotor blade according to claim 1, wherein the panel has a curved profile defined by a curved outer shape of the second surface.

4. The rotor blade according to claim 1, wherein the at least one fluid jet module is mounted by at least one adhesive, at least one tape, and/or mechanical fasteners onto the outer surface of the rotor blade.

5. The rotor blade according to claim 1, wherein the at least one fluid jet module is mounted reversibly onto the outer surface of the rotor blade.

6. The rotor blade according to claim 1, wherein the at least one fluid jet module is embedded in a recess of a shell of the rotor blade.

7. The rotor blade according to claim 1, wherein the at least one fluid jet module comprises a fluid flow channel fluidically communicating with the multiple fluid jets.

8. The rotor blade according to claim 1, wherein the orifices are fluidically connected to the at least one compressed fluid source.

9. The rotor blade according to claim 1, wherein ramps, spoilers, and/or flaps are attached to the at least one fluid jet module.

10. The rotor blade according to claim 1, wherein at least one fluid supply line fluidically connecting the at least one fluid jet module with the at least one compressed fluid source is at least partially arranged in an inside of the rotor blade, attached to a spar web of the rotor blade.

11. The rotor blade according to claim 10, wherein the at least one fluid supply line is attached externally to the outer surface of the rotor blade and routed to a feed hole inside of a shell of the rotor blade, by which the at least one fluid supply line is fed into the inside of the rotor blade.

12. The rotor blade according to claim 11, wherein the rotor blade comprises at least one structural reinforcement at a location of the feed hole.

13. A method for forming a rotor blade for a wind turbine, the method comprising:
   providing the rotor blade; and
   adding at least one fluid jet module onto an outer surface of a suction side or a pressure side to arrive at the rotor blade according to claim 1.

14. The method according to claim 13, wherein a shell of the rotor blade has a recess, into which the at least one fluid jet module is fitted.

15. The rotor blade according to claim 1, wherein the first surface of the at least one fluid jet module achieves a form fit with the outer surface of the rotor blade.

16. The rotor blade according to claim 1, wherein the second surface is located a distance above the outer surface of the rotor blade, the distance corresponding to a thickness of the at least one fluid jet module.

* * * * *